United States Patent [19]

Pronovost

[11] Patent Number: 4,645,295

[45] Date of Patent: Feb. 24, 1987

[54] FIBER OPTIC CONNECTOR

[75] Inventor: Paul F. Pronovost, New Milford, Conn.

[73] Assignee: Allied Corporation, Morris Township, Morris County, N.J.

[21] Appl. No.: 118,365

[22] Filed: Feb. 4, 1980

[51] Int. Cl.⁴ .................................................. G02B 6/36
[52] U.S. Cl. ................... 350/96.20; 350/96.21
[58] Field of Search ............. 350/96.20, 96.21, 96.22; 174/DIG. 8

[56] References Cited

U.S. PATENT DOCUMENTS

| | | | |
|---|---|---|---|
| 3,517,981 | 6/1970 | Rueger et al. | 350/96.20 |
| 3,846,010 | 11/1974 | Love et al. | 350/96.22 |
| 3,861,781 | 1/1975 | Hasegawa et al. | 350/96.21 |
| 3,902,785 | 9/1975 | Mathews | 350/96.21 |
| 3,914,015 | 10/1975 | McCartney | 350/96.21 |
| 3,923,371 | 12/1975 | Dalgleish | 350/96.21 |
| 3,933,409 | 1/1976 | Kloots | 350/96.20 |
| 3,941,485 | 3/1976 | Madden | 350/96.20 |
| 3,954,338 | 5/1976 | Hennel et al. | 350/96.20 |
| 3,966,299 | 6/1976 | Osterfield et al. | 350/96.21 |
| 4,009,931 | 3/1977 | Malsky et al. | 350/96.21 |
| 4,016,356 | 4/1977 | McLoughlin | 174/DIG. 8 X |
| 4,026,633 | 5/1977 | Grick | 350/96.21 |
| 4,029,390 | 6/1977 | Chinnock et al. | 350/96.21 |
| 4,033,668 | 7/1977 | Presby | 350/96.21 |
| 4,046,453 | 9/1977 | Fiebelkorn et al. | 350/96.21 |
| 4,076,379 | 2/1978 | Chouinard | 350/96.22 |
| 4,101,198 | 7/1928 | Heldt | 350/96.20 |
| 4,113,346 | 9/1978 | Jackson et al. | 350/96.20 |
| 4,133,601 | 1/1979 | LeGuen et al. | 350/96.21 |
| 4,139,260 | 2/1979 | Bouygues et al. | 350/96.22 |
| 4,142,776 | 3/1979 | Cherin et al. | 350/96.21 |
| 4,158,477 | 6/1979 | Phillips et al. | 350/96.21 |
| 4,186,997 | 2/1980 | Schmacher | 350/96.21 |
| 4,240,695 | 12/1980 | Evans | 350/96.21 |
| 4,241,234 | 12/1980 | Haeder | 174/DIG. 8 X |
| 4,279,466 | 7/1981 | Makuch et al. | 350/96.21 |

FOREIGN PATENT DOCUMENTS

| | | | |
|---|---|---|---|
| 252004 | 12/1976 | Fed. Rep. of Germany | 350/96.21 |
| 2748503 | 8/1978 | Fed. Rep. of Germany | |
| 2175547 | 10/1973 | France | 350/96.21 |
| 2308115 | 12/1976 | France | 350/96.21 |
| 2385107 | 1/1977 | France | 350/96.20 |
| 2386829 | 11/1978 | France | 350/96.20 |
| 2389148 | 11/1978 | France | 350/96.21 |

OTHER PUBLICATIONS

Evans "Separable Connector Development for Duplex Fiber Optic Cable" Berg Electronics Div., E.I. DuPont DeNemours & Co.
Schumacher "Fiber Optic Connector Design to Eliminate Tolerance Effects" AMP Incorporated Harrisburg, Penn.

Primary Examiner—John Lee
Attorney, Agent, or Firm—Roger H. Criss

[57] ABSTRACT

A fiber optic connector of the type in which two plugs are received within opposite ends of a socket or housing. Axially extending ridges and recesses on mating surfaces of the plugs and the socket interengage with each other in order to guarantee alignment of the optical fibers. To avoid the possibility of plug reversal, polarizing keys and keyways are provided on the plugs and sockets to guarantee that each plug can only be inserted in one way into the socket. The minimum spacing between coupled optical fibers is established by a flat shim which is secured to and suspended from an external shelf, and which extends into the interior of the socket to keep the two plugs apart. Bend end and strain relief sleeves, formed of semi-rigid material, preferably heat shrinkable to clamp tightly about the fiber optic cables, are coupled to the plugs by means of molded recesses and flanges which interengage. In one embodiment of the invention these sleeves are accordion-pleated; while in another embodiment each bend and strain relief device is molded in the form of two integral shell halves with an integral tethered cap for protection of the optical fibers when the plug is withdrawn from its socket.

17 Claims, 5 Drawing Figures

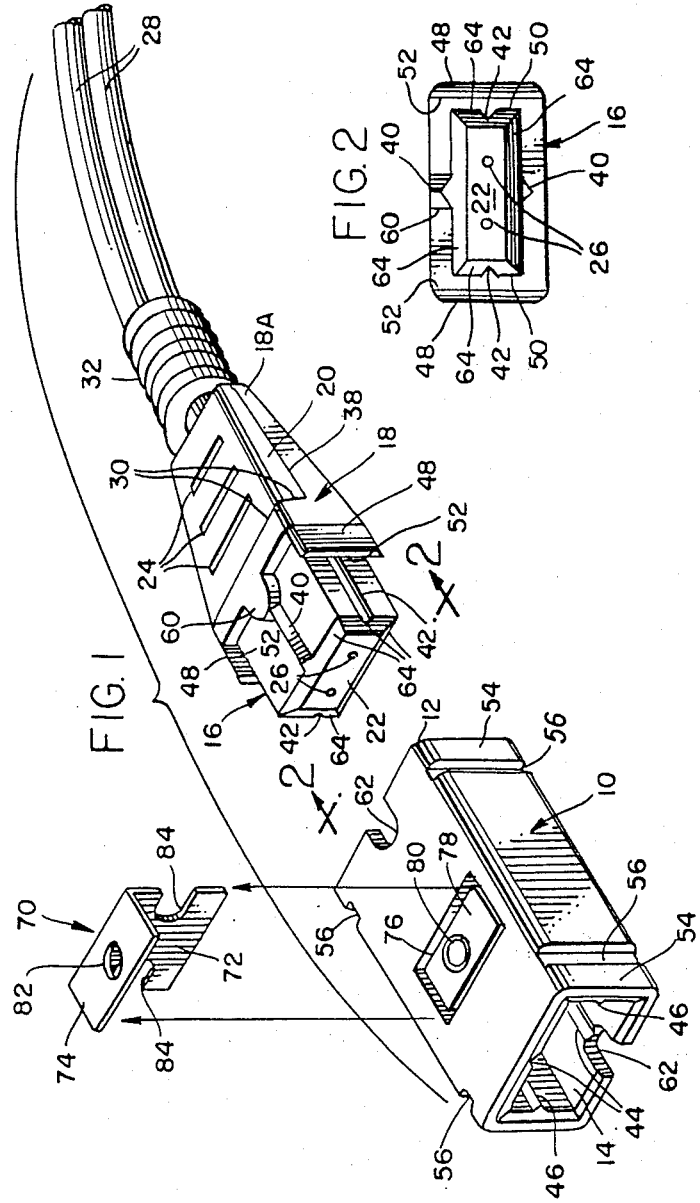

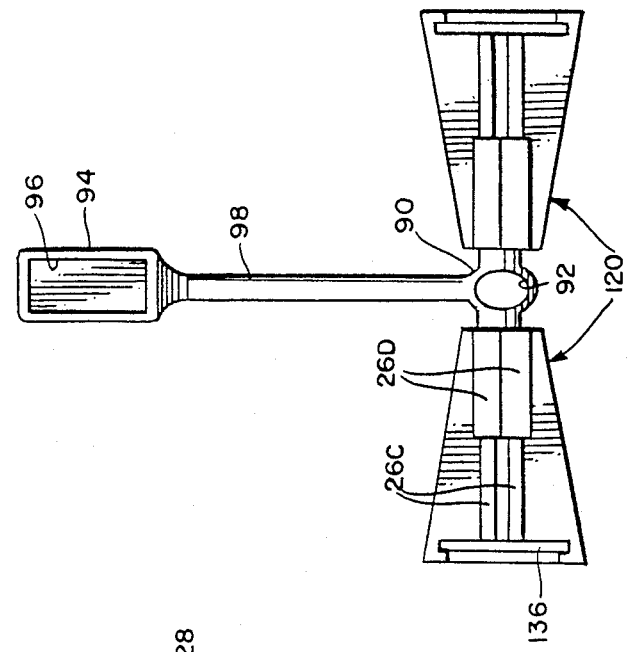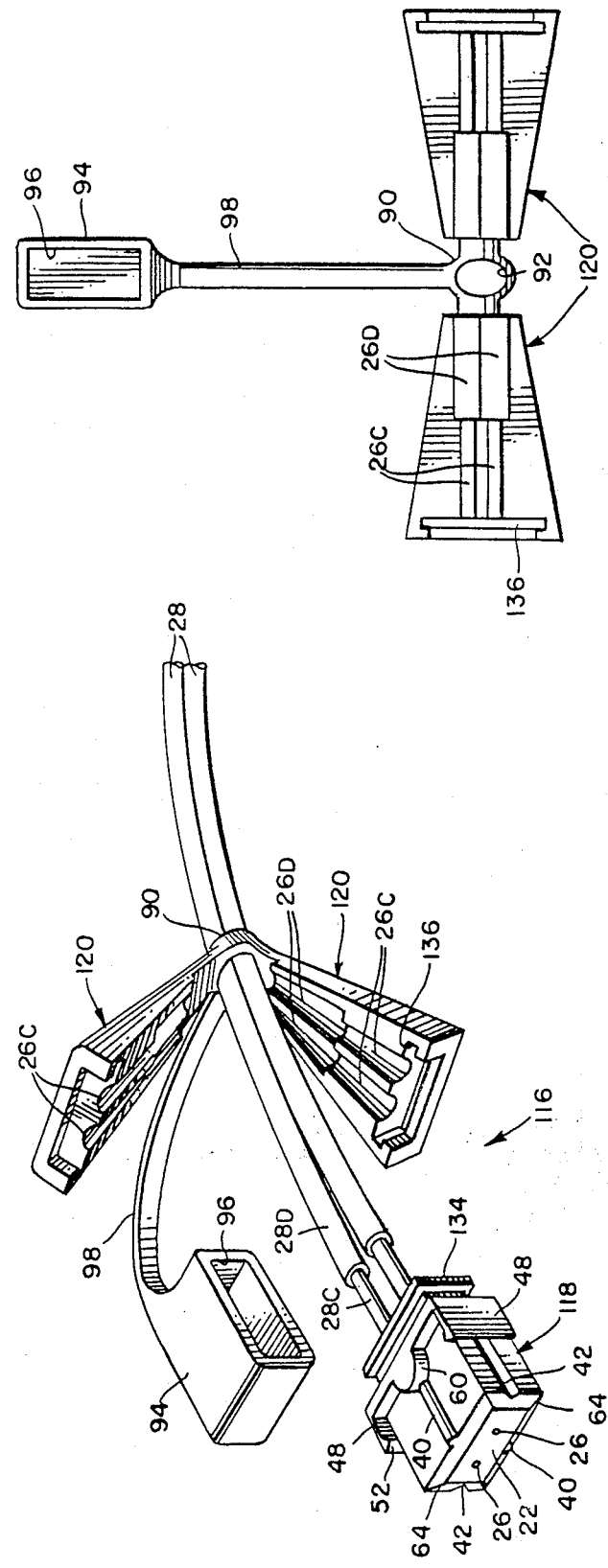

FIBER OPTIC CONNECTOR

BACKGROUND OF THE INVENTION

This invention relates to connectors for communication lines, particularly optical fiber cables.

Because of their great bandwidth, optical communications links seem likely to replace electrical lines for many applications. But optical links require transparent fibers for connections between stations, and such fibers in many ways are more difficult to work with than electrical wires.

Fibers suitable for optical communications applications are usually made of glass or plastic, and tend to be thin and relatively fragile. Therefore, in the design of optical fiber connectors, bend and strain relief are especially important considerations.

In addition, optical fibers which are coupled together must be maintained in both axial and angular alignment with each other to quite close tolerance if light losses are to be kept within acceptable limits.

This would be considerably less difficult to accomplish if it were a problem encountered only rarely and by trained physicists working in a sophisticated laboratory environment. But if optical fibers are to form the basis of a large scale communications network, they must be connected and disconnected often by ordinary personnel working in the field, without the benefit of sophisticated laboratory equipment.

The large number of such operations which will be required dictates that the connectors employed must be manufactured at high volume and low cost, but this must be accomplished without any sacrifice of alignment accuracy.

If these conflicting requirements cannot all be met simultaneously, then either higher cost or degradation of system performance must result. Consequently there is a need for an inexpensively mass-produceable optical fiber connector which is simple for installation and maintenance personnel to use in the field, but which nevertheless produces very accurate and reliable results in terms of fiber alignment.

To complicate the problem further, in many practical applications a number of optical fibers are grouped together in a cable, and should preferably be connected and disconnected as a group. It is too wasteful of time and space to connect and disconnect all the fibers of such a cable by means of individual connectors. Thus it is important that a single connector be able to handle a number of individual optical fibers, but without compromising alignment accuracy as to any of them.

Another problem encountered in the fiber optic connector field concerns the matter of fiber separation. The ends of two optically coupled fibers must approach each other very closely in order to reduce light losses to a minimum. But the two fibers must not be allowed to touch, because then they would grind against each other, destroying the planarity of the polished ends, and generating glass or plastic dust in the light path. Both lack of planarity and the presence of dust are factors which increase the scattering of light, thereby contributing to signal losses. Accordingly, it is necessary to closely control the spacing between the ends of each pair of optically coupled fibers.

Consideration must also be given to problems which may arise during times when the connector is disconnected; at such times the fragile polished ends of the optical fibers may be subjected to the risk of mechanical impact which could cause damage, or may be exposed to dirt or other environmental contaminants which can cut down severely on light transmission. Therefore it is desirable to have a protective cover readily available at all times.

Many prior art fiber optic connector devices employ a double-ended female socket or housing member and a pair of male fiber optic plugs, each of which is inserted within one end of the double-ended socket. Some examples of such connectors are seen in U.S. Pat. Nos. 4,026,633 of Crick, 3,861,781 of Hasegawa, 4,158,477 of Fiebelkorn. But in the past, such double-ended socket connector designs have not gone far enough in combining high accuracy, low light loss, and economy of manufacture. And few, if any, connector designs appear to provide protection for the exposed plugs when they are temporarily disconnected (i.e. withdrawn) from their sockets.

SUMMARY OF THE INVENTION

The present fiber optic connector is of the type including two plugs having respective axially extending optical fiber receiving bores, and a socket, housing or sleeve with two open ends, each of which is adapted to axially receive one of the plugs. In this respect it is similar to the prior art designs referred to above. The connector of this invention, however, comprises interengaging means formed on the socket and each of the plugs which extend axially for aligning the plugs relative to the socket. As a result, the optical fibers received in the bores of the two plugs are maintained in accurate alignment with each other.

In most cases the plugs would each carry two or more optical fibers; hence if one of the plugs is inserted 180 degrees out of position, the wrong fibers will be optically coupled, resulting in transmission of messages to the wrong destination. In order to prevent this, there are interengaging key and keyway means formed on one side only of the plug and one side only of the socket, so that the plug can be inserted into the socket in only one orientation relative thereto. This effectively prevents coupling of the wrong fibers and the resultant misdirection of messages.

A flat shim is received within the socket housing or sleeve between the two plugs for spacing them apart by the thickness of the shim. The shim is formed with one or more windows aligned with the plug bores to permit optical coupling of the optical fibers received therein. This permits close approach and effective coupling of the optical fibers but does not permit them to contact each other.

The plugs have strain relief sleeves formed of semi-rigid material which are secured at the end of the plug bore from which the fiber optic cable emerges. The sleeves may be shrinkable by heat so that they grip tightly around the fiber optic cables for strain relief purposes. In addition the plugs and sleeves are preferably secured together by inexpensively formed interengaging means, such as an annular recess and flange arrangements which is easily molded from plastic materials.

One way of assembling such a annular recess and flange arrangement is by molding the coupling device in two separable pieces, so that the plane of separation intersects the end of the optical fiber receiving bore where the coupling device and the strain relief sleeve fit together. This opens up the interengaging means of the coupling device to permit simple lateral insertion of the interengaging means of the sleeve for assembly purposes.

In an alternative embodiment of the invention, a bend relief device is molded of a semi-flexible elastomeric material, and includes a pair of opposed shell halves and a ring with a large enough interior opening to receive the fiber optic cable. The shell halves are both hingedly connected to opposite sides of the ring by integrally molded hinge means in such fashion that the shell halves can be swung together to form a closed shell terminating in the ring opening, and the fiber optic cable can be enclosed within that shell. Means are formed on the coupling device, and on the portions of each shell half remote from the ring, which interengage when the shell halves are closed over the coupling device, thus retaining the bend relief device and the coupling device in assembly with each other.

The shell halves are also formed with means which confront each other when the shell halves are closed over the coupling device, and which are sized to clamp the fiber optic cable therebetween for strain relief.

As an additional feature, a cover means is provided which is adapted to fit closely over the front end of the coupling device, and a tether means is integrally molded with both the cover means and the bend relief device for hingedly securing the two together. This prevents loss of the cover means when it is not in place over the front end of the coupling device, and makes sure that it will always be available when needed.

In a further alternative embodiment of the invention, the features herein disclosed can be utilized to optically couple a plug member to a light source or detector by suitably equipping or locating the socket relative thereto.

These and other features of the invention will be fully appreciated from the detailed description which follows, when taken in conjunction with the accompanying drawings.

BRIEF DESCRIPTION OF THE DRAWINGS

FIG. 1 is an exploded perspective view of a portion of a fiber optic cable connector assembly in accordance with this invention.

FIG. 2 is an end elevational view of the front end of one of the male coupling plugs of the fiber optic connector of FIG. 1, as seen from the plane designated 2—2 in FIG. 1.

FIG. 3 is a longitudinal section of the fiber optic connector assembly of FIG. 1, when fully assembled.

FIG. 4 is an exploded perspective view of an alternative embodiment of a male coupling plug intended for use in the connector assembly of FIG. 1.

FIG. 5 is a top elevational view of the bend and strain relief device and protective cover of the coupling plug of FIG. 4, all of which are integrally molded.

DETAILED DESCRIPTION OF THE PREFERRED EMBODIMENT

The connector assembly of FIG. 1 comprises a female socket, housing or sleeve member 10 which is open at both ends 12 and 14 to receive respective male fiber optic coupling plugs 16. One of these plugs 16 is illustrated in FIG. 1, in position for axial insertion into the open end 12 of socket member 10. An identical plug member 16 would normally be axially inserted into the other open end 14 of the socket member 10 or, alternatively, the socket member 10 could include only, a single given end 12 for receipt of a single plug member 16 communicating therethrough with a light source or detector. In FIG. 3 the two plug members 16 are both illustrated, and are seen fully inserted into their respective open ends of the socket member 10.

Each of the plugs 16 comprises two separable plastic molded parts 18 and 20. The larger of the two parts, a front member 18, forms the front end 22 of the plug. The tail or rear end of the plug is formed by the smaller molded part, a rear member 20, and a rearward extension 18A of front member 18. This tail section or rear end 20-18A forms a convenient handle to be gripped between the fingers when the plug 16 is inserted into or removed from the socket member 10. The member 20 and extension 18A are formed with ridges 24 which provide superior finger-gripping capability.

A pair of bores 26 for receiving the optical fibers in respective fiber optic cables 28 extend axially (longitudinally) through the entire plug 16 from the front end 22 thereof to the rear end or tail section 20-18A. As best seen in the sectional view of FIG. 3, each bore 26 is divided into four consecutive sections or segments of increasing diameter. The first and smallest segment 26A is sized to house the transparent glass or plastic optical fiber core 28A of cable 28. The next bore segment 26B is of slightly larger diameter and is intended to accommodate the transparent fiber plus the plastic buffer 28B which encloses it. The third segment 26C is still larger, to accommodate the transparent fiber, the buffer, and an additional layer of strength fibers 28C wrapped thereabout. Finally, the fourth and largest segment 26D is designed to accommodate the transparent fiber, buffer, strength fiber wrapping, and the outer plastic jacket 28D of the fiber optic cable. Note that forward of the transverse plane 30 which separates the front end of rear member 20 from front member 18, the bores 26 extend through the interior of the front member 18. To the rear of plane 30, the lower half of each bore 26 is formed in the rearward extension 18A of front member 18, and the upper half is formed in rear member 20.

Immediately behind the rear ends of the bores 26 is a tail piece 32 in the form of a sleeve of semi-flexible molded plastic material. This sleeve is preferably formed with corrugations 32A in the form of accordion-pleats so as to permit a limited range of lateral bending. The fiber optic cables 28 pass through the interior of the sleeve 32 prior to entering the bores 26. The sleeve 32 and tail sections 20-18A of plug 16 are secured together by means of a circular flange 34 formed at the front end of the sleeve 32 and an annular recess 36 formed near the rear end of the bore 26. The semi-flexible sleeve 32 serves to provide bend relief for the fragile fiber optic cables 28 by limiting the amount of bending they can undergo, and by distributing that bending over a sufficient length of the sleeve so that the cables cannot be bent very sharply. In order to perform this function, the sleeve 32 must not be so flexible that it permits the fiber optic cables 28 to bend easily, nor can it be so rigid that it does not distribute the curvature of the cables over a significant axial length. The corrugated configuration of the sleeve 32 helps to make it somewhat more flexible than it would otherwise be.

Strain relief is also important in the fiber optic field. The material of the bend relief sleeve 32 is preferably one of numerous plastic materials which is capable of great shrinkage when subjected to treatment by heat. Such heat-shrinkable materials are well known in the plastics field. Taking advantage of this feature, after the fiber optic cables 28 have been inserted through the sleeve 32, and the sleeve has been assembled at the rear end of the plug 16, the entire assembly is subjected to the appropriate heat treatment to shrink the sleeve so that the inner crests of the corrugations 32A clamp tightly about the fiber optic cables 28, thereby increasing the clamping effect and contributing to the strain relief capability of the connector.

The steps of assembling the fiber optic cable 28 with the plug 16 are as follows. First, the fiber optic cables 28 are inserted through the bend relief sleeve 32, which at this point permits the cables 28 to pass loosely therethrough. Next, the rear member 20 is lifted out of assembled relationship with the front member 18, separating therefrom along transverse plane 30 and an axial plane 38. When the members 20 and 18 separate along axial plane 38, this opens up bore segments 26B, 26C and 26D, as well as the recess 36 which is designed to receive the flange 34 of sleeve 32. Accordingly, after the front two segments 28A and 28B of the fiber optic cables are pushed axially and epoxied into their respective bore segments 26A and 26B, the remaining cable segments 28C and 28D are placed laterally into the lower halves of bore segments 26C and 26D. At the same time, the annular flange 34 is also placed laterally into the lower half of the annular recess 36. Then the rear member 20 is moved back into place, sealing all the segments of the fiber optic cables 28 within their respective segments of the bores 26, and also sealing the annular flange 34 within the annular recess 36. The assembly of the members 20 and 18 is then made permanent by any suitable process such as glueing, heat-staking or ultrasonic welding. Then the sleeve 32 is subjected to heat to shrink it tightly about the fiber optic cable 28. The front end 22 of the male plug 16 is then polished to achieve the clean planarity of the fiber core filaments 28A. At this point the assembly of the male plug 16 and fiber optic cables 28 is complete, and the plug is ready to be inserted into an open end of the double-ended socket 10 for coupling with a similar plug which is to be inserted into the other open end thereof.

In order to maintain accurate alignment of the optical fiber core filaments 28A, which is necessary for low-loss light coupling, the front member 18, near its front end 22, is formed with axially extending V-shaped ridges 40 on the top and bottom, and axially extending V-shaped recesses 42 on either side. The double-ended socket 10 is formed with correspondingly located axially extending V-shaped recesses 44 at the top and bottom which mate with the ridges 40, and correspondingly located axially extending V-shaped ridges 46 at the sides which mate with the recesses 42. As each plug 16 is axially inserted into its respective open end 12 or 14 of the socket 10, the axial ridges 40 and 46 mate with their corresponding axial recesses 44 and 42 in tongue and groove fashion, causing the plug 16 to enter the socket 10 in a position of accurate lateral, angular and longitudinal alignment for proper coupling of the fiber optic cables 28 of the two plugs 16. The front end 22 of each plug 16 is provided with chamfered surfaces 64 which facilitate initial insertion of the plugs 16 into the socket openings 12 and 14.

At the sides of the front member 18 are a pair of integrally molded flexible flaps 48. These flaps are spaced some distance away from the side walls 50 of the front end of the member 18; and they are free to flex to some extent laterally, i.e., toward and away from the side walls 50. At the front inside edge of each flap 48 there is a detent tooth 52 which extends laterally inward part of the way toward the confronting sidewall 50. As the plug 16 is inserted into one of the open ends 12 or 14 of the double-ended socket member 10, these detent teeth 52 initially strike against the outer side walls 54 of the socket member 10 near the open ends 12 and 14, thus causing the flexible flaps 48 to be deflected laterally outwardly. As insertion continues further, eventually the detent teeth 52 reach nearby recesses 56. At this point the resilient flaps 48 spring laterally inward, inserting their respective detent teeth 52 into the recesses 56 for the purpose of retaining the plug 16 in assembly with the socket member 10. The engagement between the teeth 52 and recesses 56 is over-rideable for removal of the plug 16 from socket member 10, since the flaps 48 are sufficiently resilient to flex outwardly when the plug is withdrawn. At all other times, however, they tend to resist accidental disengagement of the plug 16 from the socket 10.

Since each plug 16 has two fiber optic cables 28, it is possible to reverse these cables by inadvertently turning over the plug 16 180° about its longitudinal axis. This would result in coupling the wrong pairs of fiber optic cables 28. In order to prevent this, polarizing keys 60 and keyways 62 are provided on the plugs 16 and the socket 10 respectively to permit each plug to be inserted in only one orientation relative to the socket 10. Thus the polarizing key 60 of one of the plugs 16 is present only at the top side of the plug in line with one of the ridges 40, not at the bottom. Similarly the polarizing keyway 62 at the open end 12 of socket member 10 is present only at the top in line with the recess 44, and not at the bottom. As a result, the plug 16 which is illustrated in FIG. 1 can only be inserted into socket opening 12 in one orientation relative thereto, i.e. with the key 60 at the top. Conversely, the key 60 of the other plug 16, which is illustrated at the left-hand side of FIG. 3, is present only at the bottom of that plug. Similarly, the keyway 62 at the socket opening 14 is present only at the bottom. Once again, this permits insertion of the plug into the socket opening 14 in only one orientation relative thereto, i.e. with the key 60 at the bottom.

The plugs 16 must approach each other very closely within the double-ended socket member 10, in order that the optical fibers 28A can transmit light across an extremely small intervening space, thereby minimizing losses. However, it is not advisable for these transparent fibers 28A to come into physical contact with each other, because that is likely to cause damage to the polished faces of the fibers, and would also generate loose dust particles which would interfere with light transmission. Accordingly, a spacing shim 70 is provided, preferably in the form of a piece of sheet metal or plastic bent at a right angle to form a spacer 72 and a hanger 74. Prior to insertion of either of the plugs 16 into the socket 10, the spacer 72 is dropped vertically downward through a slot 76 formed in the top wall of the socket member 10. Insertion of the spacer 72 is limited by the hanger 74, which eventually comes to rest against a recessed shelf 78 also formed in the top wall in the socket member 10, adjacent to the slot 76. The shelf 78 is formed with an upraised circular button 80 which matches up with and projects through a circular opening 82 formed in the hanger 74. The button 80, by engaging the opening 82, serves to position the hanger 74 properly upon the shelf 78, so that the spacer 72 is suspended at the proper position within the interior of the socket member 10. When the plugs 16 are subsequently inserted into the respective opposite socket openings 12 and 14, they can approach no closer than the thickness of the spacer 72. Thus the optical fibers 28A are maintained a short distance apart. Windows 84, in the form of apertures, are cut into the spacer 72 at both sides thereof so as to provide clear paths for light transmission between the two optically aligned pairs of transparent fibers 28A.

The embodiment illustrated in FIGS. 4 and 5 is an alternative to that of FIGS. 1-3. An alternative fiber optic plug 116, illustrated in FIG. 4, is designed to be inserted into either of the socket openings 12 and 14 of the double-ended socket member 10 illustrated in FIGS. 1 and 3. The plug embodiment 116 comprises a front member 118 which is similar in many respects to the front member 18 described above. Specifically, there are axial ridges 40 and axial recesses 42 for purposes of alignment, there is a polarizing key 60 which cooperates with the polarizing keyway 62 of the socket 10, there are resilient flaps 48 formed with respective detent teeth 52 for cooperation with the recesses 56 of the socket 10, and there are also bores 26 which extend axially through the front member 118 starting at the front face 22 thereof.

However, the front member 118 entirely lacks a rear extension such as extension 18A in the embodiment discussed previously. The front member 118 is shorter than the front member 18 of the other embodiment, and terminates in a rectangular flange 134 at the rear end thereof. The entire tail section of the plug 116 is formed by a pair of integrally molded shell halves 120 which are joined at their rear ends by a ring structure 90 having an internal opening 92, best seen in FIG. 5. The two shell halves 120 and the ring structure 90 are integrally molded of an elastomeric material selected so that the shell halves 120 are inherently hinged for opening and closing movement relative to each other about the ring structure 90.

FIG. 5 shows the shell halves 120 as they look upon emerging from the mold in a fully open position relative to each other. FIG. 4 shows the shell halves 120 as they are being swung toward each other to form a closed shell structure, the axis of rotation lying in the central plane of the ring structure 90. The front ends of the shell halves 120 are formed with rectangular recesses 136 which, upon closing of the shell, engage with the rectangular flange 134 at the rear end of the front member 118. As a result, when the two shell halves 120 are completely closed about the rear end of the front member 118, the flange 134 is trapped within the sockets 136.

In assembling the plug 116, the fiber optic cables 28 are first inserted through the central opening 92 of the ring structure 90, and pushed and epoxied into the bores 26 of the front member 118. Then the shell halves 120 are swung toward each other and closed over the flange 134, forming a complete shell which is in asembled relationship with the front member 118. Then the shell halves 120 are glued, heat-staked or ultrasonically welded together so that the assembly is permanent. When thus secured to the rear of the front member 118, the completed shell 120—120 forms a convenient tail piece which can be manually grasped for inserting the front coupling member 118 into or withdrawing it from one of the socket openings 12 or 14.

The confronting surfaces of the shell halves 120 are formed with confronting recesses 26C which cooperate to form a bore for receiving the segments 28C of the fiber optic cables and also with larger recesses 26D which similarly cooperate to form larger bore segments accommodating the segments 28D of the fiber optic cables. The bore which is thus formed within the completed shell 120—120 is sized so that it clamps tightly against the fiber optic cable segments 28C and 28D, so as to provide strain relief for the cables 28.

In addition, the material of which the tail piece 120—120 is molded is semi-flexible so that it has a limited range of bending movement, thereby providing bend relief for the fiber optic cables 28.

One of the problems encountered with fiber optic plugs is that when they are not plugged into a socket member, they are subject to physical damage or dirt contamination of the transparent fibers 28A. In order to deal with this, there is provided a rectangular elastomeric molded cap 94 formed with an opening 96 at one end that is designed to fit closely over the front end 22 of the plug assembly 116. But this cover 94 can not do any good if it has become lost or misplaced during the time that the plug 116 was assembled with its socket 10, and therefore was not needed to protect the optical fibers. Therefore, a tether strap 98 is integrally molded with the cover 94 and ring structure 90 so as always to keep the cover 94 close at hand, even when it is not in use.

Thus, the structure pictured in FIG. 5 comprises a very convenient and inexpensively produced assembly comprising of two shell halves 120 which form the tail piece of the plug 116, the ring structure 90 which serves as a self-hinging mechanism and also as a rear opening to accommodate the entry of the fiber optic cables 28, and the cover 94 and the tether strap 98 which keeps it always readily available.

The socket, housing or sleeve member 10 and the plug members 16 and 116 may be fabricated of thermoplastic material for ease of manufacture and assembly while yet providing a reliable, low loss, fiber optic connector which is relatively inexpensive to manufacture. The connector and the novel features thereof are readily adaptable for a wide variety of applications. For instance, the connector may be used for in-line applications, sometimes called a "flying splice". (FIG. 3). The connector may also be used as a bulkhead connector. The connector also may be secured to a printed circuit board. In addition, the plug member 16 may be used in input/output connector applications forming a part of an emitter or detector by use of complementary sockets, housings or sleeves with the interior thereof fabricated similar to the socket 10.

With the present invention, it is possible to use a split design with the through hole contours molded into the plug member. It has been found that in addition to the traditional epoxy bonding techniques, the connector's design lends itself to ultrasonic welding of the plug portions by selecting and using suitable thermoplastics as the material for molding the connector elements. The connector design allows the optical fibers to be terminated by either polishing the fiber ends or cutting the fiber ends such as with a razor blade, when using plastic optical fibers. It has been found that providing a single continuous mating face which is not segmented at the terminal end of the plug member facilitates termination of the optical fibers as well as eliminating one common source of alignment error. Although particularly well suited for duplex fiber optic cable, the connector of the present invention can easily be modified to handle single channel fiber optic cables, multichannel fiber optic cables and planar arrays, i.e., ribbon fiber optic cables, of any number of channels, by forming the through hole or holes to conform to such cable in a manner that will readily be appreciated by those skilled in the art.

It will now be appreciated that this invention, in either of its alternative forms, provides a fiber optic connector assembly which is relatively easy and inexpensive to manufacture, but which is designed to accomplish the necessary accurate alignment of the optical fibers, along with the functions of bend relief and strain relief for fiber optic cables. Both designs provide a front section which is made of a rigid, precision-molded plastic part designed for accurate optical alignment, and a rear section which does not need to be so accurately molded, and indeed is semi-flexible for better performance of the bend relief function. In the embodiment of FIGS. 4 and 5 in particular, this tail section is easily and inexpensively molded as an integral assembly along with a tethered protective cap which is always available to protect the plug during those times when it is not inserted into a socket.

The embodiments illustrated herein are presently preferred, and are believed to constitute the best mode for practicing the invention. But various other structures may also fall within the teachings of this disclosure. Therefore, the illustrated embodiments are to be considered as merely exemplary, and the scope of protection afforded this invention is defined only in the appended claims.

I claim:

1. A fiber optic connector adapted for coupling a pair of optical fibers or a single optical fiber and a light source or detector comprising: a plug having an axially extending bore for receiving an optical fiber; a socket having an opening adapted to axially receive said plug with the plug generally conforming to said opening; and interengaging means comprising a V-shaped ridge and a complementary V-shaped recess formed on said socket and said plug on at least two sides thereof and extending axially for transversely aligning said plug to a fixed position relative to and within said socket when the plug is inserted into the socket whereby the end of said optical fiber of said plug is maintained transversely in optical alignment with the end of the other of said optical fibers or said light source or detector; said interengaging means further including complementary key and keyway means formed on one side of said plug and on one side of said socket permitting insertion of said plug into said socket in a single orientation relative thereto.

2. A fiber optic connector as in claim 1 wherein said plug has at least two bores for receiving a pair of optical fibers.

3. A connector as in claim 1, including at least one deflectable member associated with said plug and engageable with at least one side of said socket for releasably securing said plug within said socket.

4. A connector as in claim 3 wherein said plug includes a pair of deflectable members laterally spaced apart and cooperating with opposite sides of said socket.

5. A connector as in claim 4 wherein said deflectable members are flexible flaps, said flaps each having an inwardly directed detent tooth, said socket having tooth receiving recesses on opposite sides thereof.

6. A fiber optic connector as in claim 1 wherein said complementary V-shaped ridges and V-shaped recesses are disposed on diametrically opposite sides of said socket and said plug.

7. A fiber optic connector as in claim 1 wherein said socket and said plug are generally rectangularly shaped defining four sides, and including complementary V-shaped ridges and V-shaped recesses on each of said four sides of said socket and said plug.

8. A fiber optic connector as in claim 1 wherein said complementary V-shaped ridges and V-shaped recesses are centrally located on said at least two sides of said socket and said plug.

9. A fiber optic connector adapted for coupling a pair of optical fibers or a single optical fiber and a light source or detector comprising: a plug having an axially extending bore for receiving an optical fiber; a socket with at least one open end, adapted to axially receive said plug, and a transverse opening spaced from said open end; means positionable through said transverse opening in said socket for spacing said optical fiber of said plug and the other of said optical fibers or said light source or detector; said spacing means being formed with window means permitting optical coupling of said pair of optical fibers or said single optical fiber and said light source or detector; said spacing means comprising a flat shim formed with said window means therein; said spacing means including hanger means projecting transversly from said shim.

10. A fiber optic connector as in claim 9 wherein said transverse opening is disposed between the ends of said socket to admit said shim, said socket also being formed with a shelf surface adjacent said opening;
   said hanger means being mounted on said shelf surface to suspend said shim within said transverse opening.

11. A fiber optic connector as in claim 10 wherein said hanger means is formed with an aperture and said shelf surface is formed with a projection adapted to be received within said aperture for securely positioning said hanger means.

12. A fiber optic connector comprising: a coupling member formed with a fiber optic cable receiving bore; and a sleeve formed of semi-rigid material; said sleeve being secured to said coupling member at one end of said bore, and oriented substantially co-axially therewith for surrounding a fiber optic cable received therein and for providing strain and bend relief therefor, and said sleeve being of a material which will shrink tightly about said fiber optic cable when subjected to a selected condition; said sleeve and said coupling member at said one end of said bore are formed with respective interengaging means for securing them together; said interengaging means comprising a recess and a flange positioned within said recess.

13. A fiber optic connector as in claim 12 wherein: said sleeve including bend relief means with integral means for distributing bending substantially along the length thereof, said integral means for distributing bending including a plurality of corrugations.

14. A connector as in claim 12 wherein said coupling member comprises two bodies separable along an axial surface intersecting said one end of said bore to thereby open up said interengaging means of said coupling device for insertion of said interengaging means of said sleeve.

15. A fiber optic plug assembly comprising:
   a coupling member having a front end, a rear end, and at least one optical fiber receiving bore extending entirely therethrough from said rear end to said front end;
   means including a pair of opposed shell halves and ring means with a large enough interior opening to receive a fiber optic cable, said shell halves being connected to opposite sides of said ring means, said shell halves being capable of being swung together to form a closed shell terminating in said ring opening with said closed shell and said ring means enclosing and encircling said fiber optic cable; and means on said coupling member and on portions of each of said shell halves remote from said ring means interengaging with one another to retain said shell halves and said coupling member in assembled relation when said shell halves are closed over said coupling member.

16. A fiber optic plug assembly as in claim 15 wherein said shell halves are formed with means confronting each other when said shell halves are closed over said coupling member sized to receive and clamp said fiber optic cable therebetween for strain relief.

17. A fiber optic plug assembly as in claim 15, further including cover means adapted to fit closely over said front end of said coupling member and tether means intergrally securing said cover means to said ring means and shell halves.

* * * * *